(12) United States Patent
Al Hamouz et al.

(10) Patent No.: US 9,878,923 B1
(45) Date of Patent: *Jan. 30, 2018

(54) ADSORBENT COMPRISING BISPHENOL, FORMALDEHYDE AND HEXADIAMINE TERPOLYMER WITH ADSORBED PB

(71) Applicant: King Fahd University of Petroleum and Minerals, Dhahran (SA)

(72) Inventors: Othman Charles Sadeq Al Hamouz, Amman (JO); Tawfik Abdo Saleh Awadh, Alhodaidah (YE)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/712,697

(22) Filed: Sep. 22, 2017

Related U.S. Application Data

(63) Continuation of application No. 14/334,102, filed on Jul. 17, 2014, now Pat. No. 9,796,604.

(51) Int. Cl.
| | |
|---|---|
| *C08G 14/00* | (2006.01) |
| *C02F 1/28* | (2006.01) |
| *C08G 14/06* | (2006.01) |
| *B01J 41/13* | (2017.01) |
| *C02F 101/20* | (2006.01) |

(52) U.S. Cl.
CPC .............. *C02F 1/285* (2013.01); *B01J 41/13* (2017.01); *C08G 14/00* (2013.01); *C08G 14/06* (2013.01); *C02F 2101/20* (2013.01)

(58) Field of Classification Search
CPC ........ C02F 2101/20; C02F 1/285; B01J 41/13
See application file for complete search history.

(56) References Cited

FOREIGN PATENT DOCUMENTS

GB 1449528 9/1976

OTHER PUBLICATIONS

Balasubramanian et al., Synthesis and Crystal Structure of [2 + 2] Calixsalens, 2006, Royal Society of Chemistry, Organic & Biomolecular Chemistry, 4(16), 3044-3047.*
Srimurugan et al. Synthesis and Crystal Structure of [2+2] Calixalens, 2006, Royal Society of Chemistry, Organic & Biomelecutar Chemistry, 4(16), 5044-3047.

* cited by examiner

*Primary Examiner* — Taiwo Oladapo
(74) *Attorney, Agent, or Firm* — Oblon, McClelland, Maier & Neustadt, L.L.P.

(57) ABSTRACT

A cross-linked terpolymer (BSDF) obtained by polycondensation of bisphenol-S, formaldehyde and 1,6-diammohexane. The terpolymer is highly efficient in eliminating lead ions from aqueous solutions. The adsorption of lead ions on BSDF was studied under different conditions such as: pH, contact time and temperature. The adsorption kinetics fits Lagergren second order kinetic model that are in agreement with the low surface area as a chemisorption process. Applying BSDF on non-spiked and spiked real wastewater samples under optimum conditions revealed the high efficiency of BSDF in removing toxic metal ions.

4 Claims, 6 Drawing Sheets

Fig. 6. SEM image and EDX analysis for (a) BSDF, (b) BSDF loaded with lead ions.

ADSORBENT COMPRISING BISPHENOL, FORMALDEHYDE AND HEXADIAMINE TERPOLYMER WITH ADSORBED PB

CROSS-REFERENCE TO RELATED APPLICATIONS

This application is a Continuation of Ser. No. 14/334,102, now allowed, having a filing date of Jul. 17, 2014.

BACKGROUND OF THE INVENTION

Technical Field

The present invention relates to a cross-linked terpolymer, a method of making the terpolymer, and a method of removing lead ions from an aqueous solution wherein the terpolymer adsorbs the lead ions from the aqueous solution.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Sustainable water supplies are vital for human consumption, agriculture requirements and industry supplies. Wastewaters have always been a problem due to their increasing toxic threat to humans and the environment. Because of the development in technology and the increase in industrial activity, pollutants released into the environment have been increasing continuously. Due to their toxicity, there is a significant threat to the environment and public health (H. L. Ge, S. Liu, B. X. Su, L. T. g Qin, Predicting synergistic toxicity of heavy metals and ionic liquids on photobacterium Q67, J. Hazard. Mater., 268 (2014) 77-83; M. Ovečka, T. Takáč, Managing heavy metal toxicity stress in plants: Biological and biotechnological tools. Biotechnology Advances, 32, 1 (2014) 73-86—each incorporated herein by reference in its entirety).

Even, at low levels, lead as heavy metal is toxic, non-biodegradable and tends to bio-accumulate in cells of living systems (M. Javed, M. A. Saeed, Growth and bioaccumulation of iron in the body organs of Catla catla, Labeo rohita and Cirrhina mrigala during chronic exposures, International Journal of Agriculture and Biology 12, 6 (2010) 881-886—incorporated herein by reference in its entirety). Lead poisoning in humans, especially in children six years old and under causes severe damage to organs like the kidney, nervous system, reproductive system, liver and brain (C. F. Bearer, Environmental health hazards: how children are different from adults, The future of children critical issues for children and youths, 5, 2 (1995) 11-26-incorporated herein by reference in its entirety). The primary sources of lead exposure for humans is lead-based paint in old-homes and lead in drinking water (H. W. Mielke and P. L. Reagan, Soil is an important pathway of human lead exposure, Environ health perspect. 106 (1998) 217-229; M. D. Sanborn, A. Abelsohn, M. Campbell, E. Weir, CMAJ 166, 10 (2002) 1287-1292—each, incorporated herein by reference In its entirety).

As per the World Health Organization (WHO) standard, the maximum level of lead in drinking water is 0.01 mg/l, and as per the Drinking Water Standards and Health Advisories 2012 Edition, US Environmental Protection Agency, the maximum contaminant level goal of lead for drinking water is zero (WHO, Guidelines tor Drinking-Water Quality, 3rd ed., World Health Organization, Geneva, Switzerland, 2006; Drinking Water Standards and Health Advisories, EPA 822-S-12-001, Office of Water U.S. Environmental Protection Agency Washington, D.C., 2012 Edition, U.S. Environmental Agency, Drinking Water Cont., http://www.epa.gov/safewater/contaminants/index.html—each incorporated herein by reference in its entirety). However, effluents discharged from various industries usually contain lead in an amount above this level. To achieve this goal, various technologies have been developed to remove lead from wastewaters. This includes precipitation, coagulation, reverse osmosis, ion exchange, solvent extraction, flotation, and membrane separation. However, among the various techniques, adsorption is considered the most efficient method for the treatment and elimination of lead in wastewater. This is because of its simple design and its merits of effectiveness, efficiency and free sludge (F. Rozada, M. Otero, A. Moran, A. I. Garcia. Adsorption of heavy metals onto sewage sludge-derived materials. Bioresource Technology 99 (2009) 6332-6338; Dabrowski, A. Adsorption, from theory to practice. Adv. Colloid int. Sci. 93 (2001) 135-224; A. Celik, A. Demirbas, Removal of heavy metal ions from aqueous solutions via adsorption onto modified lignin from pulping wastes. Energy Sources 27 (2005) 1167-1177—each incorporated herein by reference in its entirely). Several materials have been investigated for the adsorption of lead (S. J. T. Pollard, G. D. Fowler, C. J. Sollars, and Ferry, R. Low-cost adsorbents for waste and wastewater treatment: A review. Sci. Total Environ., 116 (1992) 31-37; S. E. Bailey. T. J. Olin, R. M. Bricka, and D. D. Adrian, A review of potentially low-cost sorbents for heavy metals. Water Res. 33 (1999) 2469-2473; S. Babel, and T. A. Kurniawan, Low-cost adsorbents for heavy metals uptake from contaminated water: A review, J. Hazard. Mater. 97 (2003) 219-225; S. S. Ahluwalia, and D. Goyal, Microbial and plant derived biomass for removal of heavy metals from wastewater. Bioresour. Technol. 98 (2007) 2243-2257; M. E. Russo, F. Di Natale, V. Prigione, V. Tigini, A. Marzocchella, G. C. Varese, Adsorption of acid dyes on fungal biomass: equilibrium and kinetics characterization. J. Chem. Eng. 162 (2010) 537-545; K. K, Singh, M. Talat, S. H. Hasan, Removal of lead from aqueous solutions by agricultural waste maize bran. Bioresour. Technol. 97 (2006) 2124-2130—each incorporated herein by reference in its entirety). Promising classes of polymeric adsorbents like cross-linked polymers that contain some carboxyl motifs (E. H. Rifi, F. Rastegar, J. P. Brunette, Uptake of cesium, strontium and europium by a poly(sodium acrylate-acrylic acid) hydrogel, Talanta 42 (1995) 811-816; C. Ozeroglu, G. Keceli, Removal of strontium ions by a crosslinked copolymer containing methacrylic acid functional groups, J. Radioanal. Nucl. Chem. 268 (2006) 211-219—each incorporated herein by reference in its entirety) like derivatives based on carboxylated polysaccharides (M. Wang, L. Xua, J. Peng, M. Zhai, Adsorption and desorption of Sr(II) ions in the gels based on polysaccharide derivates, J. Li, G. Wei, J. Hazard. Mater. 171 (2009) 820-826—incorporated herein by reference in its entirety) were also found to adsorb heavy metal ions. Chelating agents containing an aminomethylphosphonate moiety were tested and found to have attractive properties as exchange resins with ligands for selective metal ion complexation or phosphonic acid groups to extract heavy metal ions from aqueous solutions or from fuel ethanol solutions (K. P. Ripperger, S. D. Alexandratos, Polymer-supported phosphorus-containing ligands for selective metal ion complexation. In Studies in Surface Science and Catalysis; Dabrowski, A., Ed.; Elsevier Science B.V.; Amsterdam, The Netherlands, 120 (1998) 473-495; K. Yamabe, T. Ihara, A. Jyo, Metal, ion selectivity of macroreticular chelating cation exchange resins with phophonic acid groups attached to phenyl groups of styrene-divinylbenzene copolymer matrix. Sep. Sci. Technol. 36 (2001) 3511-3528; D. Kolodyńska, Z. Hubicki, M. Geüca, Application of a new generation complexing agent in removal of heavy metal ions from aqueous solutions. Ind. Eng. Chem. Res. 47 (2008) 3192-3199; Z. Wang, P. Yin, R. Qu, Q. Xu, Heterogeneous synthesis of chelating resin organophosphonic acid-functionalized silica gel and its adsorption property of heavy metal ions from fuel ethanol solutions. J. App. Polym. Sci. 126 (2012) 544-551—each incorporated herein by reference in its entirety). Diethylenetriamine-functionalized polymeric adsorbents, prepared by animation of micro-beads synthesized from glycidyl methacrylate and trimethylolpropane trimethacrylate co-polymerization, have been reported for selective removal of copper and lead ions (C. Liu, R. Bai, Q. S. Ly, Selective removal of copper and lead ions by diethylenetriamine-functionalized adsorbent: Behaviors and mechanisms, Water Res. 42 (2008) 1511-1522—incorporated herein by reference in its entirety). Amino/polycarboxylic acid functionalized polymeric adsorbents have been reported to have good chelating properties toward heavy metal ions and thus can be used for the treatment of waste water (E. Repo, J. K. Warchol, A. Bhatnagar, A. Mudhoo, M. Sillanpa, Aminopolycarboxylic acid functionalized adsorbents for heavy metals removal from water, Water Res. 47 (2013) 4812-4832; K. Inoue, K. Ohto, K. Yoshizuka, T. Yamaguchi, T. Tanaka, Adsorption of lead(II) ion on complexane types of chemically modified chitosan. Bull. Chem. Soc. Jpn. 70 (1997) 2443-2447; X. F. Liang, W. G. Hou, Y. M. Xu, G. H. Sun, L. Wang, Y. Sun, X. Qin, Sorption of lead ion by layered double hydroxide intercalated, with diethylenetriaminepentaacetic acid. Colloid Surf A 366 (2010) 50-57; L, Yang, Y. Li, X. Jin, Z. Ye, X. Ma, L. Wang, Y. Liu, Synthesis and characterization of a series of chelating resins containing amino/imino-carboxyl groups and their adsorption behavior for lead in aqueous phase. Chem. Eng. J. 168 (2011) 115-124; O. Karniz Junior, L. V. A. Gurgel, R. P. Freitas, L. F. Gil, Adsorption of Cu(II), Cd(II), and Pb(II) from aqueous single metal solutions by mercerized cellulose and mercerized sugarcane bagasse chemically modified with EDTA dianhydride (EDTAD). Carbohydr. Polym. 77 (2009) 643-650; L. Wang, L. Yang, Y. Li, Y. Zhang, X. Ma, Z. Ye, Study on adsorption mechanism of Pb(II) and Cu(II) in aqueous solution using PS-EDTA resin. Chem. Eng. J. 163 (2010) 364-372—each incorporated herein by reference in its entirely). Such materials have been also reported for their regenerability and recycling, which is a crucial step in increasing the practical applicability of the adsorbent (J. Huang, M. Ye, Y. Qu, L. Chu, R. Chen, Q. He, D. Xu, Pb(II) removal from aqueous media by EDTA-modified mesoporous silica SBA-15, J. Colloid Interface Sci. 385 (2012) 137-146—incorporated herein by reference in its entirety).

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

One embodiment of the disclosure describes a cross-linked terpolymer.

In another embodiment the cross-linked terpolymer comprises polycondensed units of bisphenol-S, 1,6-diaminohexane, and formaldehyde.

In another embodiment the diamino unit of 1,6-diaminohexane bridges the aryl groups of the bisphenol unit through a nitrogen-carbon-aryl linkage.

In another embodiment the bisphenol-S, 1,6-diaminohexane, and formaldehyde units of the cross-linked terpolymer are present in a molar ratio of 1:2:4, respectively.

In another embodiment the terpolymer is in the form of a solid having a surface area in the range of 0.720-0.750 $m^2$ $g^{-1}$.

In another embodiment the terpolymer is in the form of a solid having a pore size diameter in the range of 161.0-163.0 nm.

In another embodiment the terpolymer is in the form of a solid having a total pore volume in the range of 0.028-0.032 $cm^3$ $g^{-1}$.

In another embodiment terpolymer is an adsorbent in the removal of lead ions from an aqueous solution.

In another embodiment the terpolymer effectively removes at least 90% of the lead ions from the aqueous solution.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
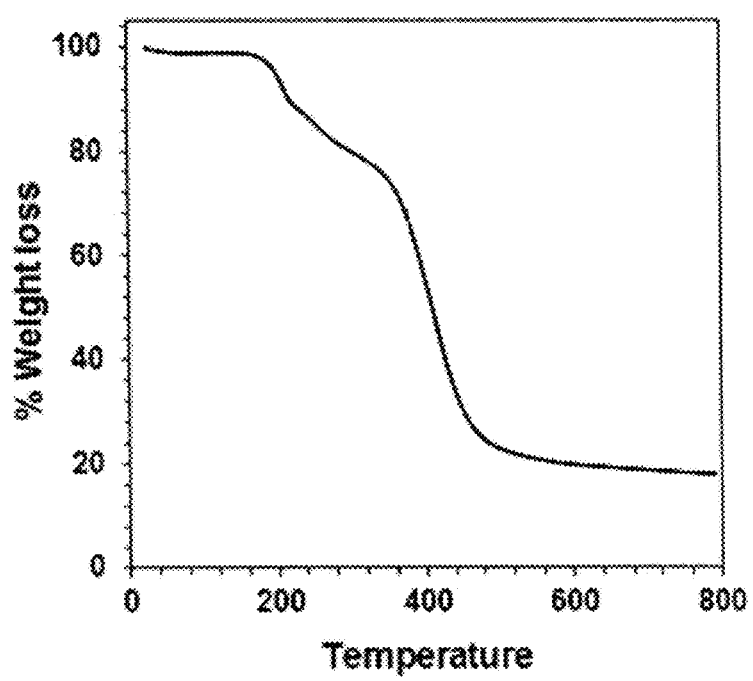
FIG. 1 is a TGA analysis of a terpolymer (BSDF)

Referring now to the drawings, wherein like reference numerals designate identical or corresponding parts throughout the several views.

One embodiment of the disclosure relates to a cross-linked terpolymer. The cross-linked terpolymer has a formula I.

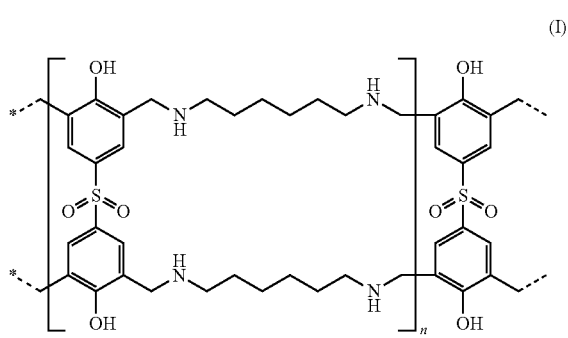

The number of repeating units of the polymer is represented by "n" which may be an integer of from greater than 1 to 10,000 l, preferably from 10 to 5,000, 20 to 2,500, 25 to 1,500, or 100 to 1,000. There are two alkyl units that link the pair of amino groups of the terpolymer (derived from a $C_6$ diamine group). The alkyl bridges are bonded to a bis-phenol group through a single carbon atom (e.g., derived from, formaldehyde). The alkyl unit connects the two amino groups to one another. The alkyl unit may be substituted or unsubstituted. In one embodiment alkyl unit is a six carbon chain that is substituted with one or more alkyl groups selected from the group consisting of methyl, ethyl, propyl, butyl, pentyl, hexyl any isomers thereof, a $C_1$-$C_6$ alkoxy group, an aryl group and/or a halogen atom. The alkyl unit represents a diaminohexane group which bridges the phenol groups of the terpolymer.

Each amino group is further bonded to an aryl group of a phenolic unit. Two phenol functional groups of a repeating unit are bonded to one another through a sulfonyl group The phenols groups are a part of a bisphenol moiety that may be substituted or unsubstituted. The aryl groups of the bisphenol may likewise optionally be substituted with one or more alkyl groups selected from the group consisting of methyl, ethyl, propyl, butyl, pentyl, hexyl any isomers thereof a $C_1$-$C_6$ alkoxy group, an aryl group and/or a halogen atom.

In other embodiments the bisphenol moiety is selected from the group consisting of 2,2-bis(4-hydroxyphenyl)propane, 1,1-bis(4-hydroxyphenyl)-1-phenyl-ethane, 2,2-bis(4-hydroxyphenyl)hexafluoropropane, 2,2-bis(4-hydroxyphenyl)butane, bis-(4-hydroxyphenyl)diphenylmethane, 2,2-bis(3-methyl-4-hydroxyphenyl)propane, bis(4-hydroxyphenyl)-2,2-dichlorethylene, 1,1-bis(4-hydroxyphenyl)ethane, bis(4-hydroxydiphenyl)methane, 2,2-bis(4-hydroxy-3-isopropyl-phenyl)propane, 1,3-bis(2-(4-hydroxyphenyl)-2-propyl)benzene, 5,5'-(1-methylethyliden)-bis[1,1'-(bisphenyl)-2-ol]propane, 1,1-bis(4-hydroyphenyl)-3,3,5-trimethyl-cyclohexane, and 1,1-bis(4-hydroxyphenyl)-cyclohexane. Preferably the bisphenol compound is the bis(4-hydroxyphenyl)sulfone shown in formula (I). Preferably the cross-linked terpolymer comprises polycondensed units of bisphenol-S, 1,6-diaminohexane, and formaldehyde (i.e., BSDF).

In another embodiment one or more metal ions are coordinated to one or more nitrogen atoms of the polymer. The metal ions that are coordinated to the are preferably heavy metal ions have a 2+ charge including $Pb^{2+}$, $Mn^{2+}$, $Fe^{2+}$, $Co^{2+}$, $Ni^{2+}$, $Cu^{2+}$, and $Cd^{2+}$ but may include $Be^{2+}$ and/or $Zn^{2+}$.

In another embodiment the weight average molecular weight of the terpolymer is in the range of including but not limited to 1,500-350,000 g/mol, 2,500-300,000 g/mol, 3,000-100,000 g/mol, or 5,000-50,000 g/mol.

In another embodiment the terpolymer is in the form of a solid material having a surface area in the range of 0.70-0.750 $m^2$ $g^{-1}$, preferably 0.720-0.750 $m^2$ $g^{-1}$, or about 0.730 $m^2$ $g^{-1}$. In another embodiment the terpolymer is in the form of a solid material having a pore size diameter in the range of 50-500 nm, preferably 75-450 nm, 100-400 nm, 125-350 nm, 150-300 nm, 175-200 nm, especially preferably 161.0-163.0 nm. In another embodiment the terpolymer is in the form of a solid material having a total pore volume in the range of 0.020-0.04 $cm^3$ $g^{-1}$, preferably 0.025-0.035 $cm^3$ $g^{-1}$, 0.027-0.031 $cm^3$ $g^{-1}$, 0.028-0.032 $cm^3$ $g^{-1}$. In another embodiment terpolymer is an adsorbent in the removal of lead ions from an aqueous solution.

EXAMPLES

Elemental analysis was performed by a Perkin Elmer elemental analyzer Series 11 Model 2400. Infrared spectra were determined on a Perkin Elmer 16F PC FTIR spectrometer. Concentrations of lead ions before and after adsorption were determined using Thermo Scientific iCE 3000 flame atomic absorption spectrometer (FAAS) equipped with a 10 cm air-acetylene burner. Concentration of metal ions in Real waste-water samples were determined using inductively coupled plasma mass spectrometry (ICP-MS) model ICP-MS-XSERIES-II Thermo Scientific (Table 1). Table 1 is presented below.

TABLE 1

| Instrument parameters for ICP | |
|---|---|
| Model | ICP-MS XSERIES-II Thermo Scientific |
| RF power | 1404 W |
| Plasma gas flow | 13 (L/min) |
| Nebulizer gas flow | 0.95 (L/min) |
| Auxiliary gas flow | 0.7 (L/min) |
| Nebulizer | Quartz pneumatic nebulizer |
| Spray chamber | Glass with peltier cooling |
| Number of replicates | 3 |
| Acquisition mode | Pulse counting |
| Dwell time | 10 (ms) |
| Sweeps/reading | 100 |
| Acquisition parameters | |
| Scanning mode | Peak Hopping |
| Dwell time | 300 ms |
| Integration mode | Peak area |

Micrometrics ASAP 2020 BET surface area analyzer with Burnauer-Emmett-Teller (BET) $N^2$ method was employed to determine the surface area of BSDF. Both Brunauer-Emmett-Teller (BET) method and the pore volumes were taken at the $P/P_0=0.974$ single point. Pore size diameter was recorded by the Barrett-Joyner-Halenda method (BJH). Scanning electron microscope, TESCAN MIRA 3 (Czech Republic) equipped with Oxford, was employed to determine the morphology of the polymer samples before and after the adsorption process. The elemental analysis of the samples was also conducted by Energy-dispersive X-ray spectroscope (EDX) equipped with a detector model X-Max. Also, the Thermogravimetric analysis of the synthesized BSDF was conducted by a thermal analyzer (STA 42.9) (Netzsch-Germany) at a constant heating rate of 10° C./min under nitrogen flow.

Bisphenol-S (4,4'-sulfonyldiphenol), 1,6-diaminohexane, paraformaldehyde and dimethylformamide were purchased from fluka Chemie AG (Buchs, Switzerland) and used as received without purification. Solvents and other chemicals used were of analytical grade.

Synthesis of Terpolymer (BSDF)

A mixture of bisphenol-S (0.01 mol, 2.50 g), 1,6-diaminohexane (0.02 mol, 232 g) and paraformaldehyde (0.06 mol, 1.50 g) in dimethylformamide (25 ml) was stirred at 80° C. for 24 h. once the temperature reached 60° C., within 3 minutes a yellow resinous material formed which was allowed to cure for 24 hours, the resinous material was washed with water and ethanol several times in order to remove any unreacted material and dried under vacuum at 60° C. until constant weight was achieved (4.98 g, 83%) (Scheme 1). (Found: C, 63.1; H, 8.5; N, 10.5; S, 5.9%. requires: C, 63.1; H, 8.3; N, 10.5; S, 6.0%); $v_{max}$(KBr) 3446, 2929, 2855, 1653, 1589, 1461, 1289, 1139, 1088, 914, 831, 692, 588 cm$^{-1}$. TGA analysis show decomposition begins around ~200° C. (FIG. 1). The surface area as well as pore size diameter and total pore volume were determined to be 0.7426 m$^2$ g$^{-1}$, 162.6 nm, 0.030 cm$^3$ g$^{-1}$, respectively. Scheme 1 is presented below.

BSDF Characterizations

Figure 2:
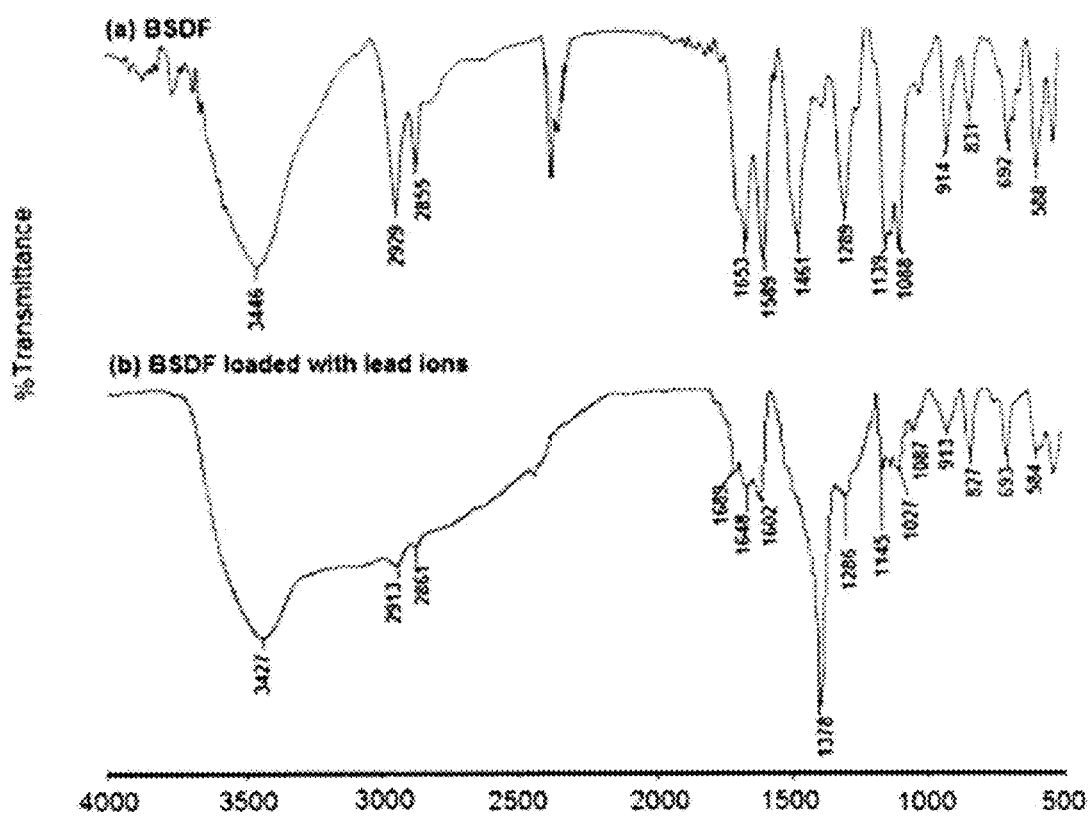
FIG. 2 is an FT-IR spectra for BSDF and BSDF loaded with lead ions.

FT-IR spectra were recorded before and after adsorption on a Perkin Elmer 16F FTIR spectrometer in a region of 4000-400 cm$^{-1}$ (FIG. 2), FIG. 2 is a FT-IR spectra for: (a) BSDF, (b) BSDF loaded with lead ions. Thermal analysis was conducted to determine the stability and modes of decomposition of BSDF terpolymer. SEM-EDX images show the surface morphology and the existence of lead ions (Pb$^{2+}$) before and after the adsorption process on the synthesized terpolymer.

Adsorption Experiments

Adsorption set of experiments were conducted using the technique of batch equilibrium in polyethylene vials (50 ml capacity). The pH of the solutions was adjusted by adding 0.1M HNO$_3$ or NaOH. A mixture of 30 mg of BSDF immersed in an aqueous solution (20 ml) of Pb(NO$_3$)$_2$ with a concentration of 5 mg L$^{-1}$ of Pb$^{2+}$ ions was stirred at different times and temperatures. Once the adsorption experiment was complete the terpolymer was filtered and the concentration of the metal ions in the filtrate was analyzed. The adsorption capacity of BSDF was calculated using Eq. (1):

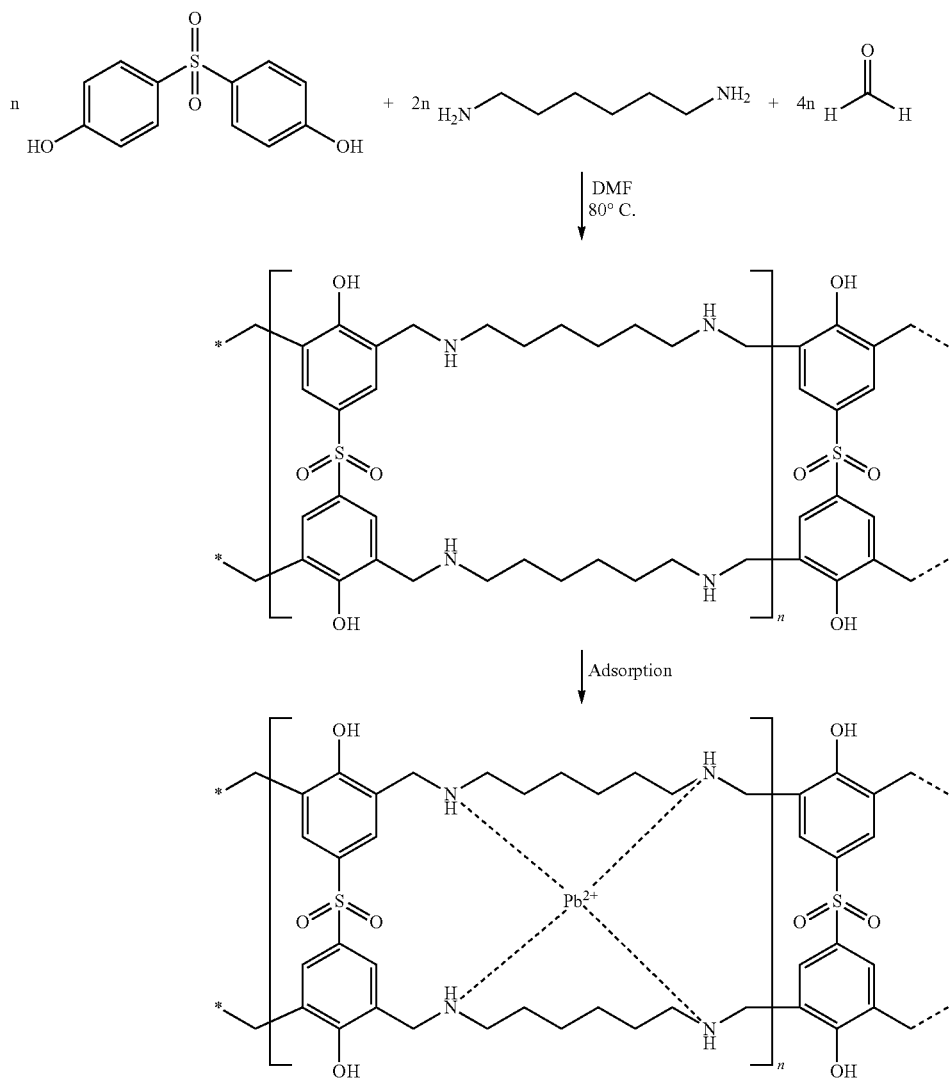

scheme 1: Synthesis of BSDF terpolymer and adsorption of Pb$^{2+}$ $$q_{Pb^{2+}} = \frac{(C_o - C_e)V}{W} \quad (1)$$

where $C_o$ is the initial metal ion concentration (mg L$^{-1}$), $C_e$ is the metal ion concentration at equilibrium (mg L$^{-1}$), V is the volume of solution (L), W is the weight of BSDF terpolymer (g), and $q_{Pb}^{2+}$ is the adsorption capacity at equilibrium (mg g$^{-1}$).

Quality Control and Quality Assurance

Quality control (QC) was maintained beginning with the design of the experimental work, sampling and continue through the final validation of the obtained results. QC for lead ion determinations included repeated of injections and periodic analysis of standard solution. The loss of lead and contamination of aliquots were limited to a minimum as per the requirements of quality control and assurance of results. The relative standard deviation of the results was ≤5%.

A terpolymer for the removal of toxic metal ions from aqueous solution has been synthesized by polycondensation of bisphenol-S, paraformaldehyde and 1,6-diaminohexane in DMF as solvent. The polycondensation reaction was fast and the product was produced within 3 minutes at 60° C. as a light yellow resinous material that was left to cure at 80° C. for 24 h which indicates the potential importance for industrial application. The structure was in agreement with the elemental analysis, FIG. 1 is a TGA analysis of BSDF. Thermal analysis (FIG. 1) showed initial decomposition around 180° C., and showed two steps of decomposition: step 1; slow loss of 21.6% due to the loss of $SO_2$, step 2; large major loss of 61.2% due to the combustion of the nitrogenated organic fraction with the release of $CO_2$, $NO_x$ and $H_2O$ gases; the residual mass at 800° C. was found to be 18.0%.

Effect of pH on the Adsorption

Figure 3:
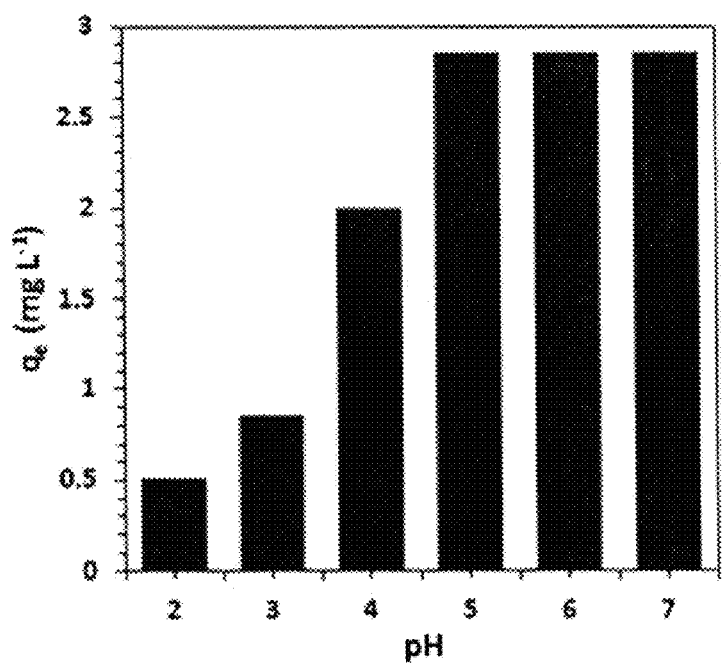
FIG. 3 is a graph that shows the effect of pH on the adsorption capacity of $Pb^{2+}$ ions by BSDF.

The pH of the solution of the lead ions plays a critical role in the adsorption process. This parameter influences the lead chemistry in water and metal binding sites (G. Raj. Chemical Kinetics in Advanced Physical Chemistry, 4th ed., Geol Publishing House: Meerut, India; (2001) 669-676—incorporated herein by reference in its entirety). As a function of pH solution, at pH more than 7, the lead ions precipitate forming a lead hydroxide precipitate (P. X. Sheng, Y. P. Ting, J. P. Chen, L. Hong, Sorption of lead, copper, cadmium, zinc, and nickel by marine algal biomass: characterization of biosorptive capacity and investigation of mechanisms, J. Colloid Interface Sci. 275 (2004) 131-141—incorporated herein by reference in its entirety). Below pH of around 6, positive lead ions Pb(II) is the dominant species in the solution. Between pH above 6 and around 8, lead undergoes hydrolysis to Pb(OH)$^+$ (H. B. Bradl. Adsorption of heavy metal ions on soils and soils constituents, J. Colloid Interface Set, 277 (2004) 1-18; M. Machida, R. Yamazaki, M. Aikawa, H. Tatsumoto, Role of minerals in carbonaceous adsorbents for removal of Pb(II) ions from aqueous solution, Sep. Purif. Technol. 46 (2005) 88-94—each incorporated herein by reference in its entirety). The effect of pH on the adsorption of lead ions on BSDF was investigated using the synthetic solutions of lead with initial concentrations of 5 ppm (FIG. 3). FIG. 3 is a graph that shows the effect of pH on the adsorption capacity of Pb$^{2+}$ ions by BSDF. The obtained results of the conducted experiments indicate that lead ions uptake by BSDF increased with the increase of pH from 3 to 7. Experiments beyond pH of 7 were not undertaken due to the formation of lead hydroxide precipitate. At pH of around 3, the ions uptake was low due to the increase in competition between protons (H$^+$) from the solution and positively charged metal ions. The highest efficiency of BSDF was observed at pH between 5 and 6 with around 90% uptake of the lead ions after 30 min of contact time. Thus, the maximum uptake of Pb(II) on the surface of the BSDF was obtained at pH range between 5 and 6.

Adsorption Properties of BSDF

The adsorption of metal ions on BSDF is due to the presence of chelating functional ligands of —NH and —OH groups that are characterized in FIG. 2A as a broad strong peak at 3446 cm$^{-1}$ due to the overlap of both functional groups, which upon Pb$^{2+}$ adsorption shifted to 3427 cm$^{-1}$. This could be related to the effect on the stretching vibrational as shown in FIG. 2b. The symmetric and asymmetric vibrations of S═O were assigned 1139 and 1289 cm$^{-1}$. The C—N absorption frequency was assigned 1461 cm$^{-1}$ that disappeared upon the appearance of a new strong peak at 1378 cm$^{-1}$ which is assigned to the presence of the ionic nitrate group; as adsorption experiments were performed in lead nitrate solutions. This result implies the potential use BSDF as an anion exchanger.

Adsorption Kinetics

Figure 4:
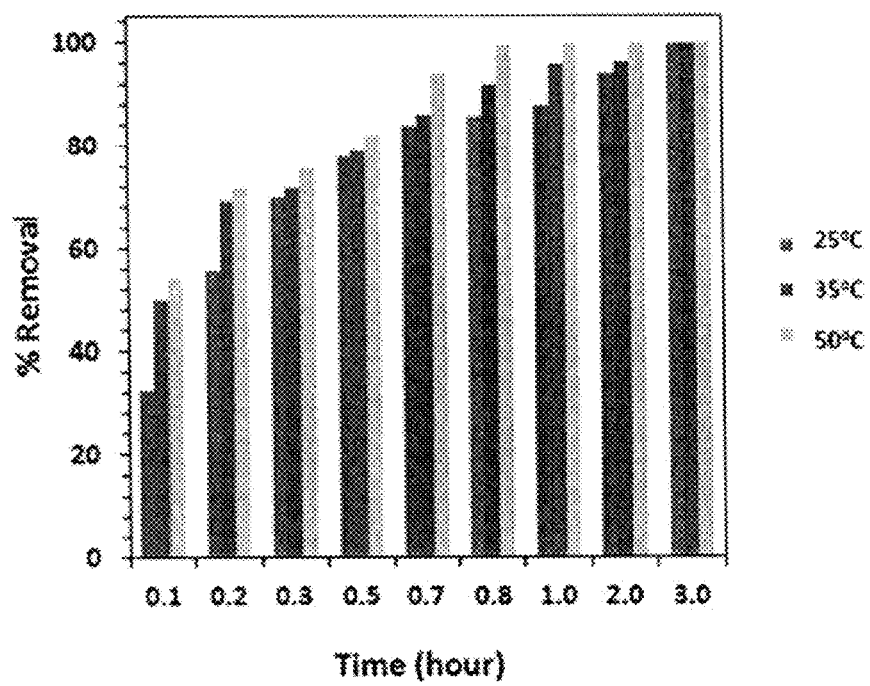
FIG. 4 is a graph that shows the percent removal of $Pb^{2+}$ ions by BSDF at different temperatures.
Figure 5A:
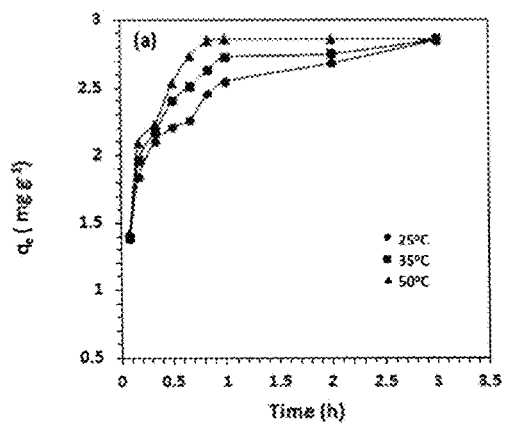
FIG. 5A shows the effect of time on the adsorption of $Pb^{2+}$ by BSDF at different temperatures.
Figure 5B:
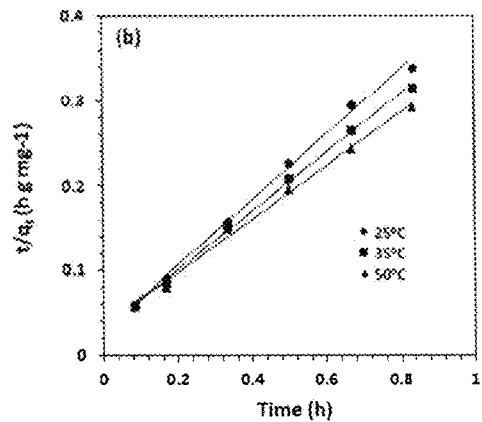
FIG. 5B shows the Lagergren-second order kinetics of $Pb^{2+}$ adsorption on BSDF at different temperatures.
Figure 5C:
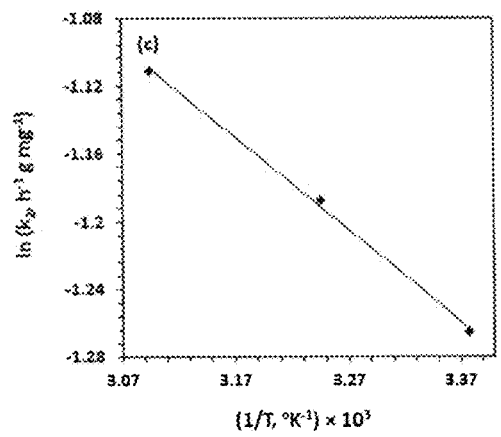
FIG. 5C shows the activation energy determination for $Pb^{2+}$ adsorption on BSDF.
Figure 5D:
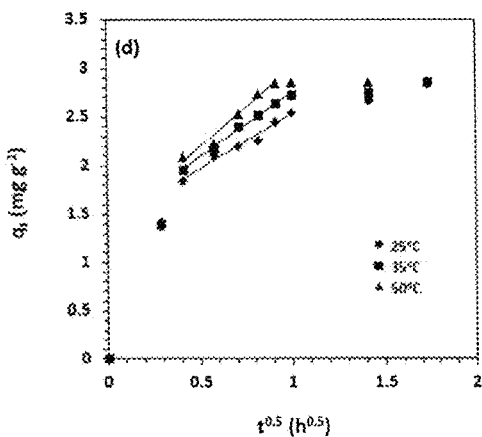
FIG. 5D shows an intraparticle diffusion plot for $Pb^{2+}$ adsorption on BSDF at different temperatures.

Adsorption kinetics were performed as follow: 20 ml solution of 5 mg L$^{-1}$ of Pb$^{2+}$ ions with 30 mg of BSDF were stirred at 25° C., 35° C. and 50° C. for different times starting from 5 minutes to 3 hours, in order to investigate the rate and mechanism of adsorption. The adsorption process shown in FIG. 4 was found to be fast and efficient as the % removal of Pb$^{2+}$ ions reached 100% within 3 hours at 25° C. and 50 minutes at 50° C. (FIG. 4, FIG. 5A) which indicates that higher temperatures increases the efficiency of adsorption by increasing the diffusion of Pb$^{2+}$ into BSDF, FIG. 4 is a graph of the percent removal of Pb$^{2+}$ ions by BSDF at different temperatures. FIG. 5A is a graph of the effect of time on the adsorption of Pb$^{2+}$ by BSDF at different temperatures. FIG. 5B is a graph of Lagergren-second order kinetics of Pb$^{2+}$ adsorption on BSDF at different temperatures. FIG. 5C is a graph of activation energy determination for Pb$^{2+}$ adsorption on BSDF. FIG. 5D is a graph of an intraparticle diffusion plot for Pb$^{2+}$ adsorption on BSDF at different temperatures. Lagergren first-order and second-order kinetic models were employed, and Intraparticle diffusion model was used to investigate the mechanism of adsorption.

Lagergren First-Order Kinetic Model

Lagergren kinetic models were used to investigate the rate and mechanism of the adsorption process, first order kinetic model is based on the assumption that each lead ion is adsorbed to one site on the adsorbent surface. The following equation is used in the linear form of Lagergren-first order kinetic model:

$$\log(q_e - q_t) = \log q_e - \frac{k_1 t}{2.303} \quad (1)$$

where $q_e$ and $q_t$ (mg g$^{-1}$) are the adsorption capacities at equilibrium and at time t (h), respectively, and $k_1$ is the rate constant for the first order adsorption process (h$^{-1}$). $k_1$ and $q_{e,cal}$, at different temperatures were experimentally determined and calculate using the intercept ad slope of equation 1 (Table 2). The poor regression values and experimental data showed the inadequacy of using the first-order kinetic model. These results suggest that the adsorption of Pb$^{2+}$ on BSDF did not follow the first-order kinetic model (Y. S. Ho, Citation review of lagergren kinetic rate equation on adsorption reactions, Scientometrics, 59 (2004) 171-177; H. K. Boparai, D. M. O'Carroll, Kinetics and thermodynamics of cadmium ion removal by adsorption onto nanozerovalent iron particles, J. Hazard, Mater. 186 (2011) 458-465—each incorporated herein by reference in its entirety). Table 2 is presented below.

TABLE 2

Lagergren First and Second-Order Kinetic Model fitting Parameters for the adsorption of $Pb^{2+}$ ions[a] on BSDF

| Metal ion | Temp (K) | $q_{e,exp}$ (mg g$^{-1}$) | Lagergren first-order | | | | Lagergren second-order | | | | $E_a$ (kJ mol$^{-1}$) |
| --- | --- | --- | --- | --- | --- | --- | --- | --- | --- | --- | --- |
| | | | $k_1$ (h$^{-1}$) | $q_{e,cal}$ (mg g$^{-1}$) | $R^2$ | $k_2$ (h$^{-1}$g mg$^{-1}$) | $h^b$ (h$^{-1}$g$^{-1}$ mg) | $q_{e,cal}$ (mg g$^{-1}$) | $R^2$ | | |
| $Pb^{2+}$ | 298 | 2.857 | 1.98 | 2.04 | 0.8962 | 0.279 | 1.90 | 2.61 | 0.9964 | | 4.51 |
| | 308 | 2.857 | 0.48 | 1.20 | 0.7158 | 0.305 | 2.55 | 2.89 | 0.9980 | | |
| | 323 | 2.857 | 0.13 | 0.705 | 0.2813 | 0.330 | 3.33 | 3.17 | 0.9951 | | |

[a]Initial metal ion concentration 1 mg/L.
[b]Initial adsorption rate h = $k_2 q_e^2$.

Lagergren Second-Order Kinetic Model

Lagergren second-order kinetic model is used to analyze the kinetics of chemical adsorption from liquid to solid adsorbent. The linear form of Lagergren second-order can be described as (FIG. 5B):

$$\frac{t}{q_t} = \frac{1}{k_2 q_e^2} + \frac{1}{q_e}t \quad (2)$$

where $q_e$ and $q_t$ (mg g$^{-1}$) are the adsorption capacities at equilibrium and at time t(h), respectively, and $k_2$ is the rate constant for the second-order adsorption process (g mg$^{-1}$h$^{-1}$), and $k_2 q_e^2$ (mg g$^{-1}$ h$^{-1}$) or h is the initial adsorption rate.

The experimental data with high regression values fits Lagergren second-order kinetic model which assumes chemical adsorption which agrees with BET analysis. The low surface area of BSDF concludes that the adsorption process depends mainly on chemisorption rather than physisorption. The increase in temperature shows increase in the adsorption capacity which may be due to higher accessibility of $Pb^{2+}$ ions toward the adsorption sites in BSDF.

The adsorption activation energy (FIG. 5C) can be determined using the rate constants ($k_2$) from the second-order kinetic model and temperature by Arrhenius linear equation described as:

$$lnk_2 = -\frac{E_a}{2.303\ RT} + constant \quad (3)$$

where $k_2$ is the second-order rate constant (g mg$^{-1}$h$^{-1}$), $E_a$ is activation energy of the adsorption process (kJ mol$^{-1}$), T is the absolute temperature (°K) and R is the universal gas constant (8.314 J mol$^{-1}$ K). The low actuation energy for the adsorption process (4.51 kJ mol$^{-1}$) indicates the favorability of the chemisorption process.

Intraparticle Diffusion Model

The mechanism of adsorption for a solid-liquid adsorption process can be described by three steps: the transfer of metal ions from the bulk solution through liquid film to the adsorbent external surface (film diffusion), intraparticle diffusion, where the metal ions diffuse through the external surface into the pores of the adsorbent, and adsorption on the interior surface of the adsorbent.

The final step is considered rapid and is negligible as the adsorption process conies to equilibrium. To identify the mechanism controlling the adsorption mechanism, Weber and Morris Intraparticle diffusion model was used in order to determine whether the rate limiting step is controlled by film diffusion or Intraparticle diffusion and can be described using the following equation:

$$q_t = K_i t^{0.5} + x_i \quad (4)$$

where $q_t$ is the adsorption capacity at time t, $K_i$ is the rate constant of intraparticle diffusion, $x_i$ is related to boundary layer thickness. In order for the adsorption process to be totally controlled by Intraparticle diffusion model a plot of $q_t$ versus $t^{0.5}$ has to fit the model and pass through the origin. But it has been reported that the plot of $q_t$ versus $t^{0.5}$ is multilinear and the adsorption process proceeds via multiple steps (E. I. Unuabonah, K. O. Adebowale, B. I. (Olu-Owaolabi, kinetic and thermodynamic studies of the adsorption of lead (II) ions onto phosphate-modified kaolinite clay, J. Hazard. Mater. 144 (2007) 386-395—incorporated herein by reference in its entirety).

The adsorption process of $Pb^{2+}$ ions by BSDF (FIG. 5D) showed three linear steps: first, rapid adsorption that represents film diffusion, the second linear step shows gradual increase in the adsorption capacity representing the rate-limiting step by Intraparticle diffusion (table 3), and finally, the third linear step which is considered reaching equilibrium. Table 3 is presented below.

TABLE 3

Intraparticle Diffusion parameters for the adsorption of $Pb^{2+}$ ions on BSDF at different temperatures.

| Metal ion | Temp (K) | $K_i$ (mg g$^{-1}$ h$^{0.5}$) | Intercept values ($x_i$) | $R_i$ | $R^2$ |
| --- | --- | --- | --- | --- | --- |
| $Pb^{2+}$ | 298 | 1.144 | 1.392 | 0.513 | 0.9768 |
| | 308 | 1.328 | 1.425 | 0.501 | 0.9943 |
| | 323 | 1.458 | 1.477 | 0.483 | 0.9583 |

As shown in FIG. 5D the plot did not pass through the origin indicating that Intraparticle diffusion is not the only rate determining step. As shown in table 3 the intercept values increased as the temperature increased which could be attributed to the increase in thickness of the boundary layer surrounding the adsorbent, suggesting that film diffusion becomes more effective in the rate determining step with the increase in temperature (F. C. Wu, R. L. Tseng. R. S. Juang, initial behavior of Intraparticle diffusion model used in the description of adsorption kinetics, Chem. Eng. J. 153 (2009) 1-8; T. I. Kamims, polycrystalline silicon for integrated circuits and displays, Kluwer Academic Publishers, Norwell, Mass., 1998—each incorporated herein by reference in its entirety).

In order to study the initial behavior of adsorption, the initial adsorption factor of the Intraparticle diffusion model ($R_i$) can be described as:

$$R_i = 1 - \frac{x_i}{q_e} \quad (5)$$

where $x_i$ is the initial adsorption amount and $q_e$ the final adsorption amount at the longer time. As shown in table 3, $R_i$ values decrease with the increase in temperature which can be explained by the increase role of film diffusion in the rate determining step. The Ri values were found to be ~0.5 indicating strong initial adsorption of ~50% and the rest is governed by Intraparticle diffusion.

SEM-EDX Analysis of BSDF and BSDF loaded with $Pb^{2+}$ ions

Figure 6A:
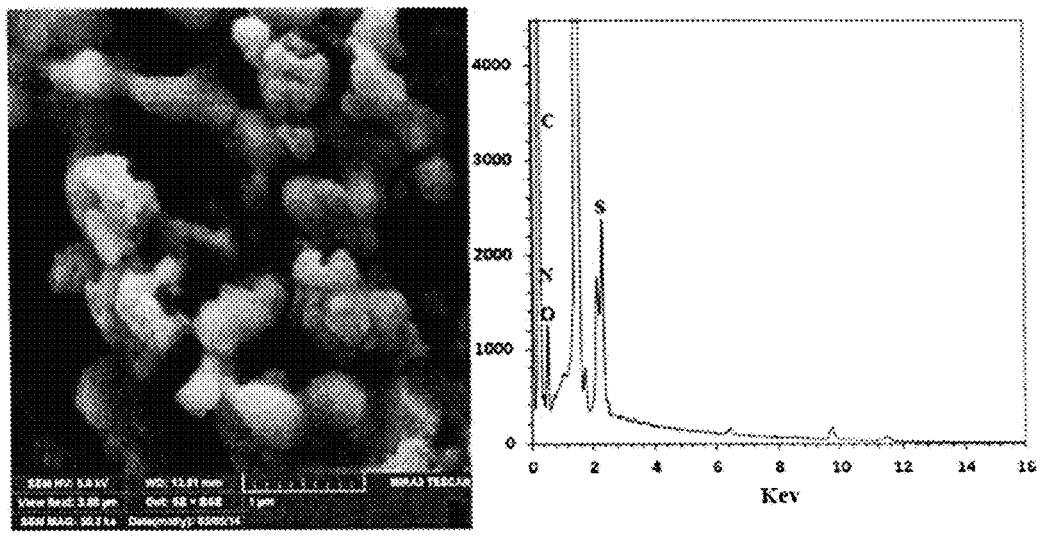
FIG. 6A shows SEM images and EDX analyses for BSDF.
Figure 6B:
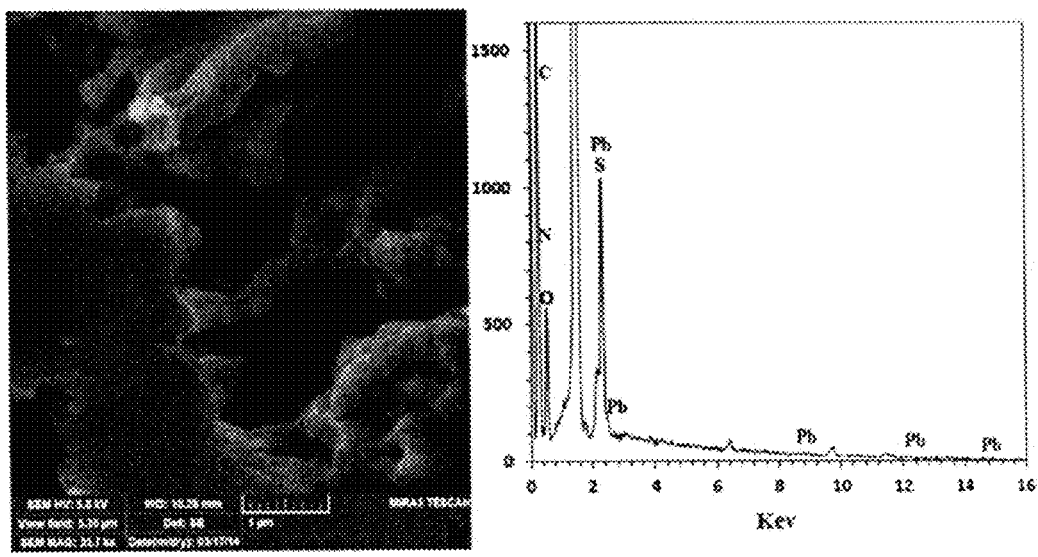
FIG. 6B shows SEM images and EDX analyses for BSDF loaded with lead ions.

Loaded and unloaded BSDF terpolymers were studied by scanning electron microscopy (SEM). BSDF terpolymer was soaked in a 20 mg $L^{-1}$ solution of lead nitrate ($Pb(NO_3)_2$) for 3 hours, filtered and washed with distilled water then dried under vacuum at 60° C. until constant weight is achieved. The loaded and unloaded BSDF polymers were coated with a 5 nm thin film of gold. The SEM-EDX analysis (FIG. 6) proved the composition of BSDF terpolymer, and also, proved the capability of BSDF to adsorb lead ions. The color of BSDF (light yellow) changed after adsorption of lead ions into white which also shows the capability to adsorb lead ions form aqueous solutions. FIG. 6A is a SEM image and EDX analysis for BSDF. FIG. 6B is a SEM image and EDX analysis for BSDF loaded with lead ions.

In order to assess the potential of the BSDF tor the treatment of wastewater in real life, wastewater samples, were collected from the field, and then treated with BSDF. Some wastewater samples were also spiked with 1 mg $L^{-1}$ or with 5 mg $L^{-1}$ of lead. Then, 20 mL of each sample was loaded with 30 mg of BSDF under the optimized conditions. The results presented in table 4 indicate the high efficiency and capability of BSDF to adsorb toxic metals like arsenic, cadmium and lead. The higher capability of BSDF in eliminating toxic metal ions from wastewater can be assigned to the increase in the —HN: moiety over the —$H_2N^+$ moiety in the chain structure as discussed in the characterization section. Table 4 is presented below.

TABLE 4

Comparison of metals concentration from water treatment plant sample (Dhahran, Saudi Arabia) before and after adding the treatment with BSDF.

| Metal | Original sample ($\mu g\ L^{-1}$) | After treatment ($\mu g\ L^{-1}$) | | |
|---|---|---|---|---|
| | | Original sample spiked with $Pb^{2+}$ ions | | |
| | | 0 | 1000 ($\mu g\ L^{-1}$) | 5000 ($\mu g\ L^{-1}$) |
| Pb | 0.826 ± 0.018 | <MDL | 0.427 | 4.24 |
| Co | 0.360 ± 0.09 | <MDL | <MDL | <MDL |
| Cu | 29.36 ± 0.064 | 3.80 | 1.84 | 3.19 |
| Zn | 395.4 ± 0.025 | 0.218 | 0.241 | 1.22 |
| As | 6.34 ± 0.024 | <MDL | <MDL | <MDL |
| Mo | 14.63 ± 0.018 | 12.64 | 10.72 | 10.67 |
| Cd | 0.58 ± 0.015 | <MDL | <MDL | 0.058 |
| Sb | <0.012 | <MDL | <MDL | <MDL |

Mean and standard deviation of three replicates (n = 3).
±Values are the method detection limit (MDL), 3σ of the blank sample.

A novel cross-linked terpolymer (BSDF) composed of Bisphenol-S, formaldehyde and 1,6-diaminohexane was synthesized and characterized. The efficiency of BSDF as adsorbent was tested for the adsorption of lead ions from aqueous solutions under various operational variables, such as contact time, pH and temperature. The results showed that the lead ions uptake by was rapid. It was also found that the removal percentage was high in pH range between 5 and around 6. The adsorption of lead ions increased with increasing temperature, indicating that the adsorption process is endothermic in nature. The novel terpolymer was found to have excellent % removal that reached 100% in the removal of lead ions. The novel terpolymer showed high efficiency in the removal of toxic metal ions which implies the high potential for industrial applications.

A cross-linked terpolymer (BSDF) has been synthesized by poly condensation of Bisphenol-S, Formaldehyde and 1,6-Diaminohexane. The terpolymer was found to be highly efficient in eliminating lead ions from aqueous solutions. The adsorption of lead ions on BSDF was studied under different conditions such as: pH, contact time and temperature. The adsorption kinetics fits Lagergren second order kinetic model that came in agreement with the low surface area as a chemisorption process. The adsorption of lead ions reached 100% removal efficiency of lead ions at 5 mg $L^{-1}$ concentration at pH=5.5. The low activation energy of 4.5 kJ/mol for the adsorption of lead ions on BSDF supported the spontaneous and fast adsorption of lead ions on BSDF. Applying BSDF on non-spiked and spiked real wastewater samples under optimum conditions revealed the high efficiency of BSDF in removing toxic, metal ions. Accordingly, the use of BSDF can be considered a promising method for eliminating lead ions from wastewater effectively.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A heavy metal adsorbent, comprising:
   a cross-linked terpolymer having a formula (I) and $Pb^{2+}$ ions adsorbed onto the cross-linked terpolymer:

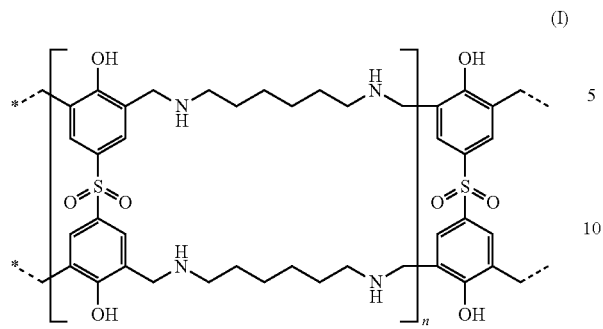

wherein:
n is the number of repeating units and n is an integer from greater than 1 to 1,000,
wherein the cross-linked terpolymer has a weight average molecular weight of 1,500-350,000 g/mol.

2. The heavy metal adsorbent of claim 1, which is in the form of a solid material having a surface area in the range of 0.720-0.750 $m^2g^{-1}$.

3. The heavy metal adsorbent of claim 1, which is in the form of a solid material having a pore size diameter in the range of 161.0-163.0 nm.

4. The heavy metal adsorbent of claim 1, which is in the form of a solid material having a total pore volume in the range of 0.028-0.032 $cm^3g^{-1}$.

* * * * *